US008781130B2

(12) United States Patent
Burbridge et al.

(10) Patent No.: US 8,781,130 B2
(45) Date of Patent: Jul. 15, 2014

(54) ACCESS CONTROL

(75) Inventors: Trevor Burbridge, London (GB); Andrea Soppera, London (GB)

(73) Assignee: British Telecommunications Public Limited Company, London (GB)

( * ) Notice: Subject to any disclaimer, the term of this patent is extended or adjusted under 35 U.S.C. 154(b) by 9 days.

(21) Appl. No.: 13/576,064

(22) PCT Filed: Jan. 14, 2011

(86) PCT No.: PCT/GB2011/000047
§ 371 (c)(1),
(2), (4) Date: Jul. 30, 2012

(87) PCT Pub. No.: WO2011/092451
PCT Pub. Date: Aug. 4, 2011

(65) Prior Publication Data
US 2012/0300937 A1    Nov. 29, 2012

(30) Foreign Application Priority Data

Jan. 29, 2010 (EP) ..................................... 10250145

(51) Int. Cl.
*H04L 9/08* (2006.01)
*G06F 21/00* (2013.01)
(52) U.S. Cl.
USPC ............................................ 380/278; 726/27
(58) Field of Classification Search
None
See application file for complete search history.

(56) References Cited

U.S. PATENT DOCUMENTS

2003/0115468 A1* 6/2003 Aull et al. ..................... 713/175
2003/0196087 A1* 10/2003 Stringer et al. ............... 713/171
2004/0015723 A1* 1/2004 Pham et al. ................... 713/201
2008/0164976 A1  7/2008 Griffiths-Harvey et al.
2012/0046970 A1* 2/2012 Potts et al. ......................... 705/3

FOREIGN PATENT DOCUMENTS

WO    WO 2009/083710    7/2009

OTHER PUBLICATIONS

International Search Report for PCT/GB2011/000047, mailed Jul. 28, 2011.
Written Opinion of the International Searching Authority for PCT/GB2011/000047, mailed Jul. 28, 2011.
EP Search Report for EP Application No. 10250145, dated Oct. 14, 2010.
Ateniese, G. et al., "Proxy Re-Signatures: New Definitions, Algorithms, and Applications", Proceedings of the 12$^{th}$. ACM Conference on Computer and Communications Security, vol. Conf. 12, (Nov. 7, 2005), pp. 310-319.

* cited by examiner

*Primary Examiner* — Gilberto Barron, Jr.
*Assistant Examiner* — David Le
(74) *Attorney, Agent, or Firm* — Nixon & Vanderhye PC

(57) ABSTRACT

Control apparatus (30), systems and methods for enabling access to one or more information systems (36) by one or more entities (34) on a path across a supply network to be controlled, access to the or each information system (36) being policed by means of an access-policer (38), the network comprising: at least one token-issuer (32) operable to issue an access pre-authorization token, the access pre-authorization token having associated therewith an information identifier and a digital signature, and to forward the access pre-authorization token towards one or more entities (34) on a path across the network; and at least one receiver entity (34) operable to receive an access pre-authorization token issued by the at least one token-issuer (32).

15 Claims, 4 Drawing Sheets

Entities/Roles Involved

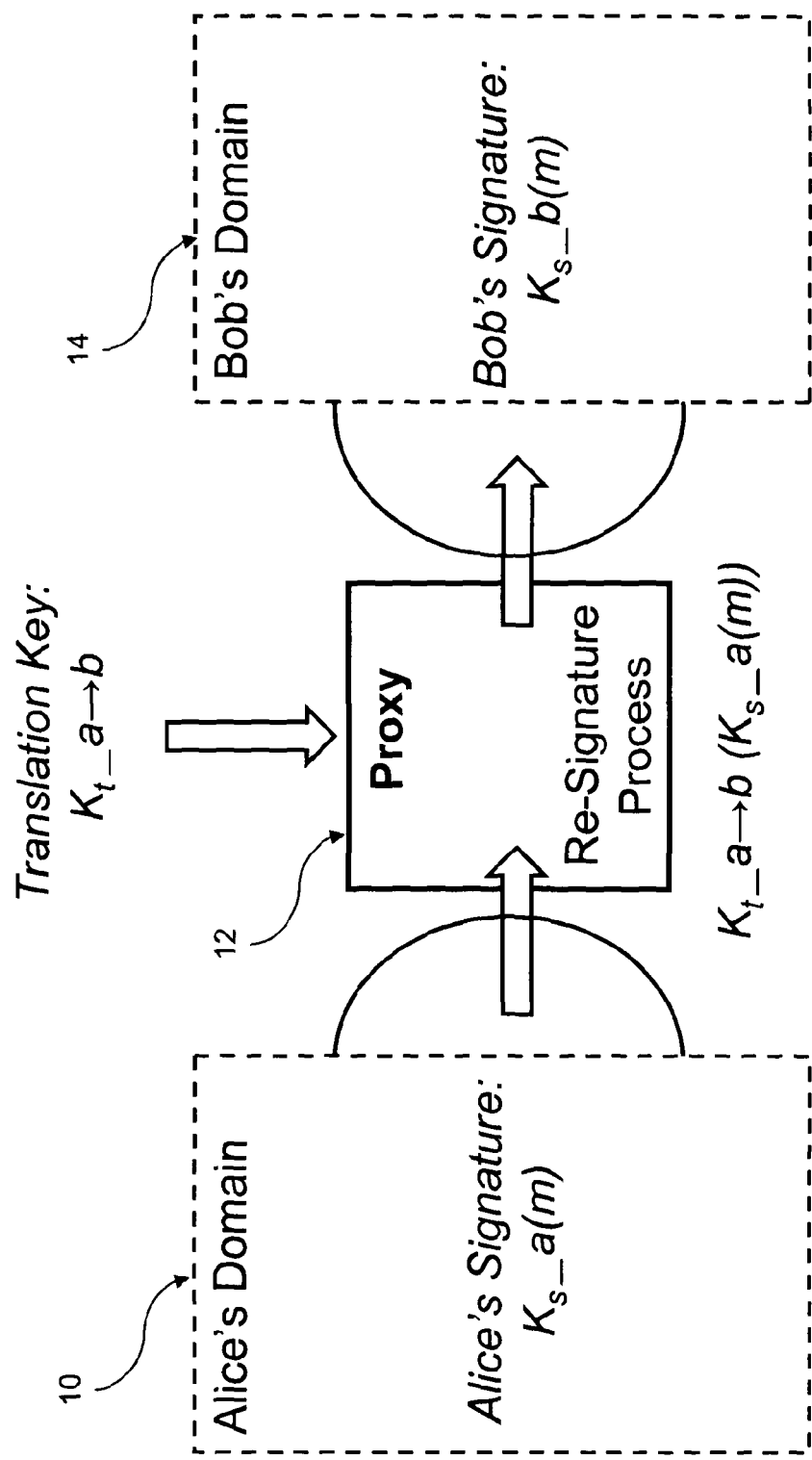
Figure 1 - Proxy Re-Signature Scheme – PRIOR ART

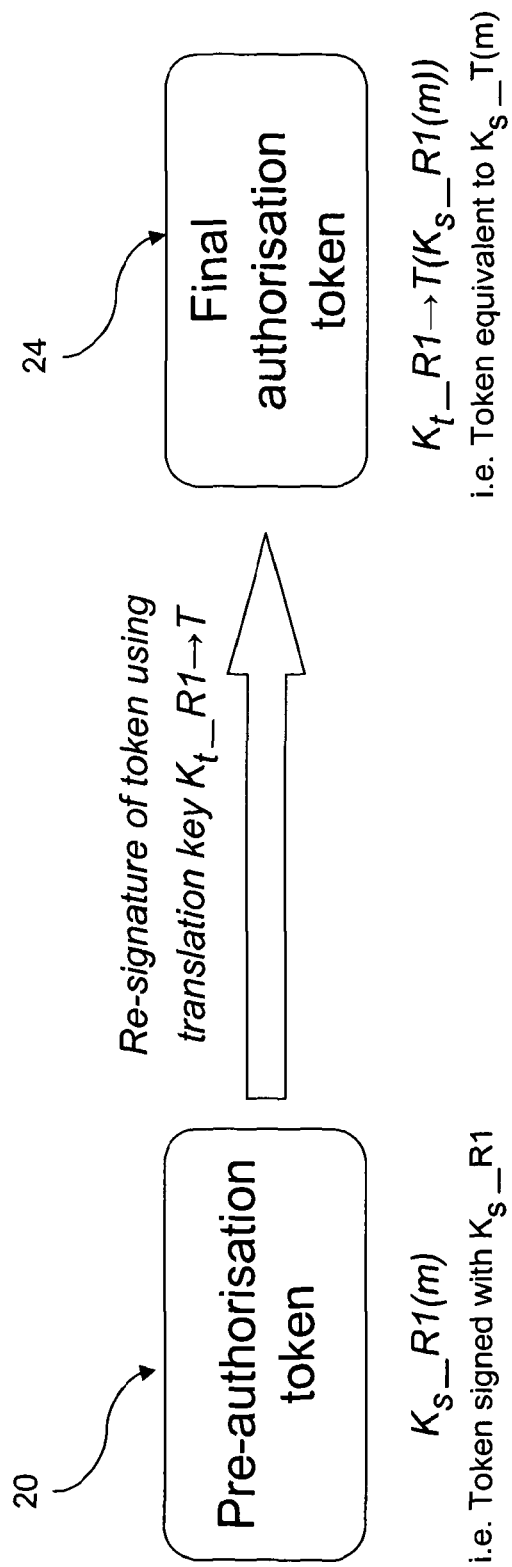
Figure 2 - Generation and Re-Signing of Security Tokens

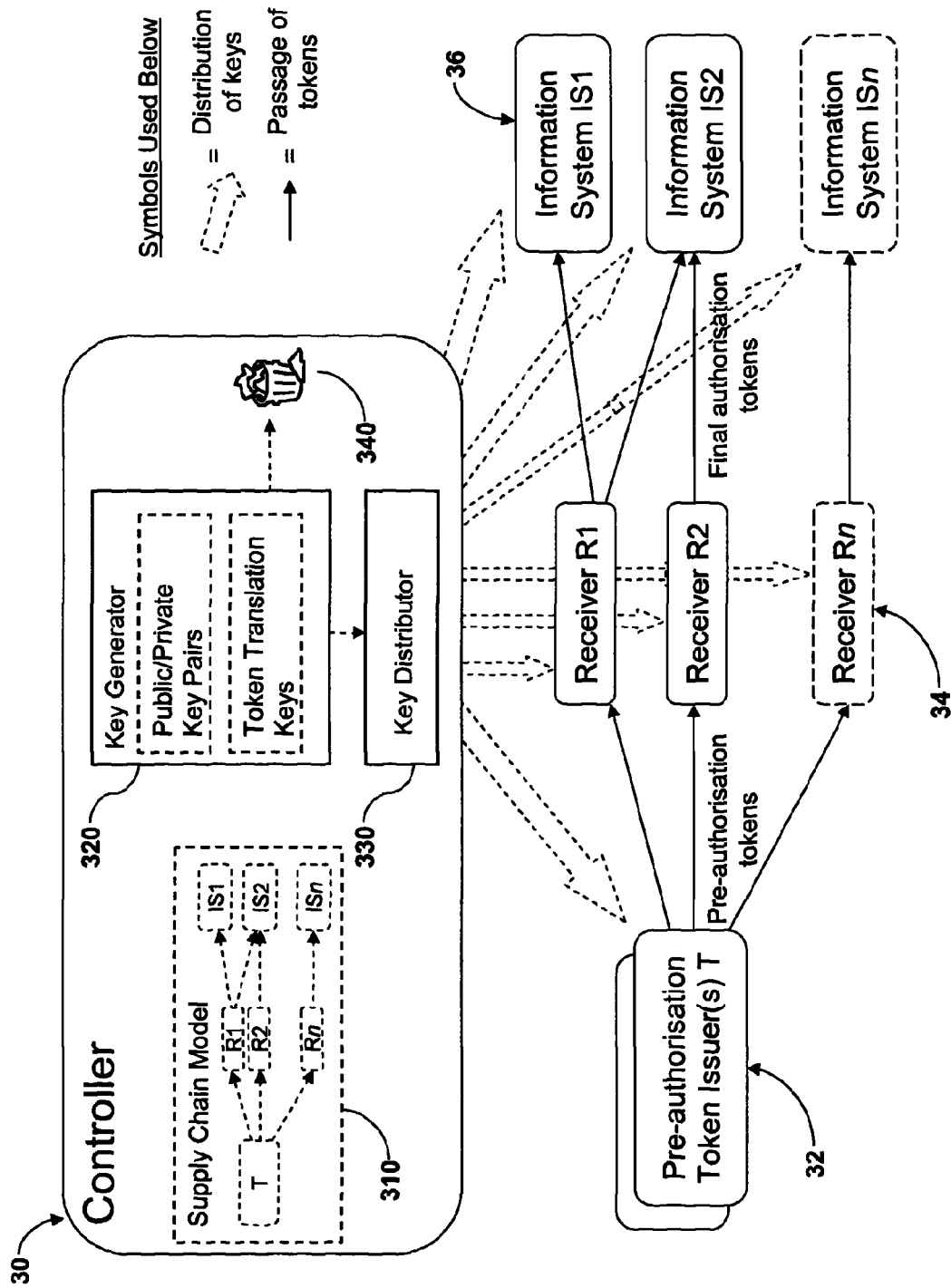
Figure 3 – Entities/Roles Involved

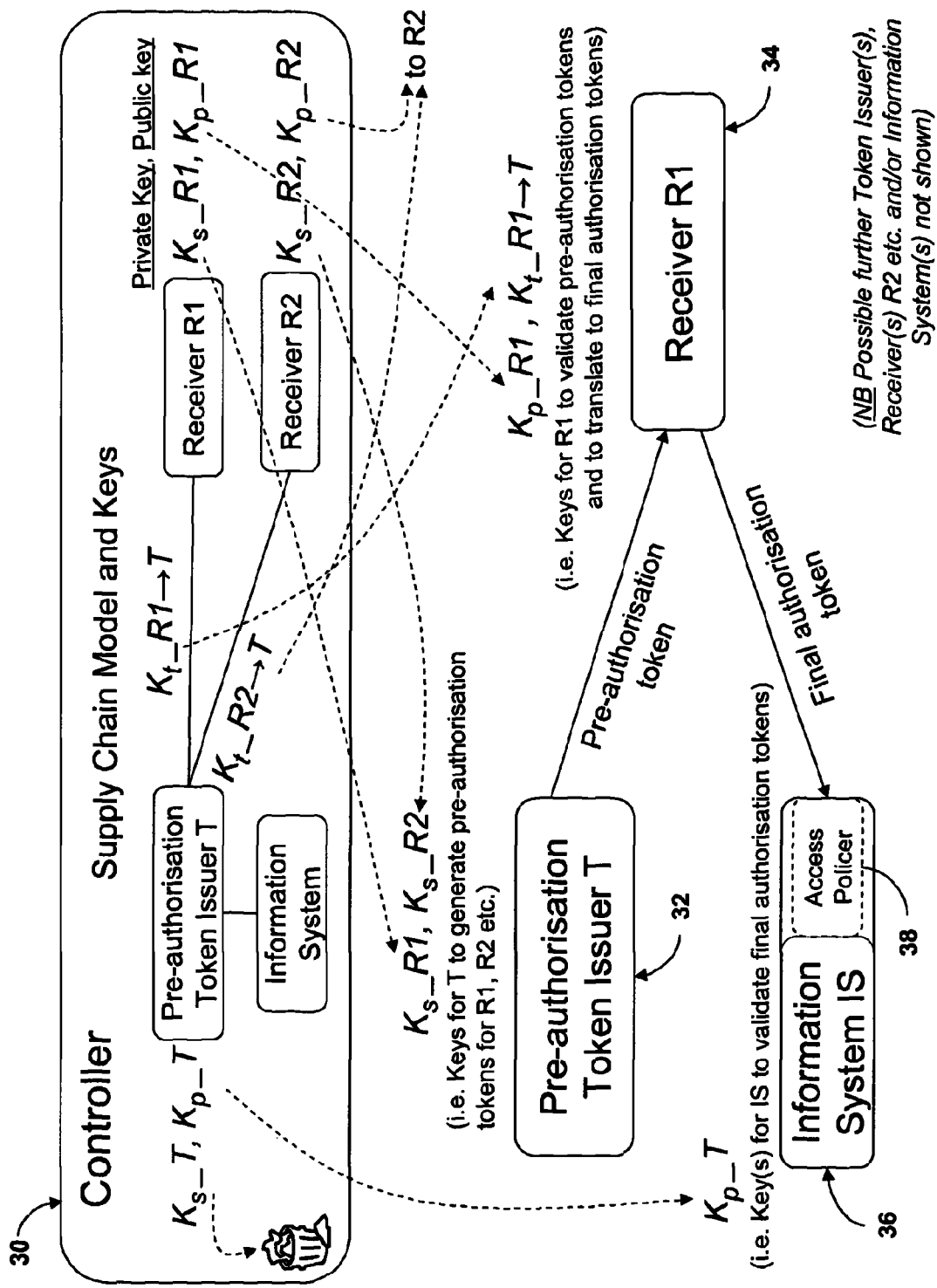
Figure 4 – Generation/Distribution of Keys

ACCESS CONTROL

This application is the U.S. national phase of International Application No. PCT/GB2011/000047, filed 14 Jan. 2011, which designated the U.S. and claims priority to EP Application No. 10250145.9, filed 29 Jan. 2010, the entire contents of each of which are hereby incorporated by reference.

TECHNICAL FIELD

The present invention relates to apparatus, systems and methods for controlling access to information systems. More specifically, aspects of the present invention relate to apparatus, systems and methods for enabling access to one or more information systems by one or more entities on a path across a supply network to be controlled.

BACKGROUND TO THE INVENTION AND PRIOR ART

Radio Frequency IDentification (RFID) is an emerging technology for use within supply chains to tag and track individual products. Each of a number of products (or assets such as transportation items, including boxes, pallets, roll cages etc.) can be given a unique serialised identifier which is stored within the RFID tag and can be read by other parties. Each organisation can collect such product information and store it within its own data services (such as an EPCIS or "Electronic Product Code Information Service") and use this information to optimise it own internal operations.

The collection of such product information is also heralded as enabling a new category of applications that use data from multiple organisations. Examples include the optimisation of the end-to-end supply path, and verifying the complete "pedigree" of a product (i.e. whether it has been received from a correct or approved source). To gain such benefit from serialised product data, each organisation must be willing to expose the data to a select group of other organisations. The release of data must generally be strictly controlled to only those parties that are trusted and have a legitimate agreed purpose for the data since the data may reveal confidential information about the organisation's operations.

A challenge involves how one organisation can establish such access rights to its own data for external organisations. This is particularly problematic because appropriate access control may need to be both fine-grained and dynamic. The access control may need to be fine-grained because individual products may flow along different paths through an end-to-end supply chain. Thus, while a distributor may wish to share information about a particular product with a particular retailer, it may not wish to share information about similar products that have been sent to different retailers. The access control may need to be dynamic because it is often impossible to define such access rights before the operation of the supply chain. A distributor, for example, may not know in advance which serialised products it will be receiving, and hence which data it will need access to from a manufacturer. Further, the distributor may not know which products it will then distribute to individual retailers, and hence which information it must share with such retailers.

PRIOR ART

An earlier International application WO 2009/083710 describes a technique for automatically establishing access rights to a serialised information system. According to this document, an RFID tag's memory may be used to store a reference at which a receiving system could automatically apply for access rights to the serialised data concerning the item to which the RFID tag was affixed. Such a reference is referred to as an 'invitation'. On receiving the tagged item, the receiving system may use the invitation to contact a token-issuing system. After passing a number of tests (potentially including authenticating the receiving system's identity, confirming that the item has been shipped to the receiver and authenticating the validity of the RFID tag containing the invitation) a token may be issued to the receiving system that can then be used to access a number of serialised information systems.

One disadvantage of the technique described in the previous paragraph is that the security relies upon either a check that the item has been dispatched to the receiver or authentication checks on the RFID tag itself. In either case the issuing system itself must be contacted to verify the identity and other credentials of the receiver, and to generate the token. This may be quite an intensive procedure, potentially overwhelming the token-issuing server with the validation checks and the creation of the signed tokens. Usage of authentication-capable tags would raise the cost of the RFID supply chain operations and potentially cause difficulties since all manufacturers would need to use secure tags complying with the same authentication standards.

A co-pending European application having application number EP 08 253 008 filed by the present applicant on 12 Sep. 2008 and later published as EP 2 166 493 discusses the use of proxy re-encryption technology for securing supply chains. In this case the re-encryption may be used to translate a signature on a tag which is used to validate that the tag has travelled via an authorised supply path.

With conventional approaches such as those discussed above, the willingness to share data in general needs to be defined by or reflected by complex access rights and policies. Changing and enforcing such access rights generally requires human administration and complex systems. The present inventors have identified a need for more dynamic access rights than those conventionally employed, and for less computationally-intensive performance-oriented access control enforcement for the data. It may, for example, be desirable for the receipt of a specific item to allow a supply chain participant to be able to access the manufacturing record of that specific item.

Other techniques may involve the establishment of access control policies for downstream "receiver organisations" when goods are shipped to them. One drawback of such approaches is that individual access control policies generally need to be set for each product or item that is shipped to each potential recipient, potentially resulting in an enormous number of such policies. This can become both unmanageable and unscalable in the evaluation of such a policy set when access is attempted to serial-level information systems. The present inventors have identified potential advantages in being able to set generic access control policies that may simply state that any entity possessing a valid token for a particular product or asset identifier is permitted access to a specified set of information (e.g. shipping information for the relevant item, or information from a particular information system). This may allow policies to be simplified since unique credentials (such as identity) for each downstream entity may not need to be included in the access control policy.

Referring briefly to other prior patent documents, United States patent application US2008/0164976 ("Griffiths-Harvey") discloses an authenticated RFID system that uses elliptic curve cryptography (ECC) to reduce the signature size and read/write times when compared to traditional public key implementations such as "RSA", a well-known public-key cryptography algorithm first (publicly) described by Rivest, Shamir and Adleman. Different digital signature schemes and algorithms can be used to reduce the signature size and hide a portion of an RFID tag that contains sensitive product identifying information. As a result, smaller tags can be used or multiple signatures can be written at different stages in a manufacturing or supply chain. A key management system may be used to distribute the verification keys and aggregate signature schemes may be provided for adding multiple signatures to the RFID tags, for example in a supply chain.

SUMMARY OF THE INVENTION

According to a first aspect of the present invention, there is provided control apparatus for enabling access to one or more information systems by one or more entities on a path across a supply network to be controlled, access to the or each information system being policed by means of an access-policer, the network comprising: at least one token-issuer operable to issue an access pre-authorisation token, said access pre-authorisation token having associated therewith an information identifier and a digital signature, and to forward said access pre-authorisation token towards one or more entities on a path across said network; and at least one receiver entity operable to receive an access pre-authorisation token issued by said at least one token-issuer; the control apparatus comprising:
  a key generator operable to generate, in respect of said at least one receiver entity:
    (i) a receiver entity public key/private key pair comprising a public key and a private key, the receiver entity public key enabling a digital signature guaranteeing the authenticity of a message created using the receiver entity private key to be verified; and
    (ii) a token translation key, said token translation key enabling translation of a digital signature created using a private key generated in respect of said at least one receiver entity into a digital signature associated with the token-issuer;
  the key generator being further operable to generate, in respect of said at least one token-issuer:
    (iii) a token-issuer public key/private key pair, said token-issuer public key enabling a digital signature guaranteeing the authenticity of a message created using said token-issuer private key to be verified;
  the control apparatus further comprising a key distributor operable to distribute:
    to said at least one token-issuer, the receiver entity private key generated in respect of said at least one receiver entity;
    to said at least one receiver entity, the token translation key generated in respect of said at least one receiver entity; and
    to said access-policer, said token-issuer public key.

According to preferred embodiments, the key distributor may be further operable to distribute to said at least one receiver entity the receiver entity public key generated in respect of said at least one receiver entity. Using this, a receiver entity may attempt to decrypt pre-authorisation tokens received from a token issuer, thereby ensuring that these have been correctly issued in respect of the information concerned by the expected token issuer. This can prevent the receiver entity from attempting to request access to information systems using incorrectly issued or otherwise invalid tokens.

According to preferred embodiments the access pre-authorisation token and/or the digital signature may be stored in a memory component of the information identifier with which said token is associated, or they may be associated with the information identifier in other ways as will be discussed below.

Information identifiers themselves may identify one or more particular information systems (i.e. information systems in respect of which the token issuer is trusted to grant access). Alternatively or additionally, information identifiers may identify one or more particular items (products, for example) in relation to which the information identifiers are intended to be associated. It should be noted that in some scenarios, a particular receiver entity may only attempt to access one information system, in which case information identifiers would generally only need to identify the item(s) concerning which information may be requested.

According to preferred embodiments, information identifiers may be stored in the memory of radio-frequency identification devices (i.e. "RFID tags"). Many alternatives to this exist, however: they may be electronic or digitally encoded manifest (on an electronic device or printed as a barcode, for example). Electronic manifest may be carried on a memory device (such as an RFID tag, memory stick, Wi-fi or Bluetooth memory device) or may be released by a courier from a laptop or palm computer, for example.

The token translation key generated in respect of a particular receiver entity is preferably generated in dependence on the token-issuer private key of the key-pair generated in respect of the token-issuer and in dependence on the receiver entity private key generated in respect of said at least one receiver entity.

According to preferred embodiments, the token-issuer public key generated in respect of a particular token-issuer enables a digital signature guaranteeing the authenticity of a message created using a receiver-entity private key associated with said at least one receiver entity then translated using a token translation key generated in respect of said at least one receiver entity to be verified. Further, the token-issuer public key generated in respect of a particular token-issuer preferably enables a digital signature guaranteeing the authenticity of a message created using a receiver entity private key associated with said at least one receiver entity then translated using a token translation key generated in respect of said at least one receiver entity to be verified in the event that said receiver entity private key generated in respect of said receiver entity has been distributed to said token-issuer.

According to preferred embodiments, the token-issuer may be operated under the control of an entity trusted by the access policer of one or more information systems to grant access to said one or more information systems.

There may be a plurality of information systems, access to said information systems being policed by means of respective access-policers. Similarly, there may be a plurality of token-issuers each operable to issue access pre-authorisation tokens. Where a plurality of information systems are present with respective access policers, they may all "trust" a common token issuer, or respective access policers may have "trust" relationships with different token issuers.

Similarly, there may be plurality of receiver entities, which may each be operable to receive access pre-authorisation tokens issued by a common token-issuer, or, where a plurality of token issuers are present, respective receiver entities may be operable to receive access pre-authorisation tokens issued by a different token-issuers.

According to a second aspect of the present invention, there is provided a system for enabling access to one or more information systems by one or more entities on a path across a supply network to be controlled, access to the or each information system being policed by means of an access-policer, the system comprising:

control apparatus according to the first aspect;
at least one token-issuer operable to issue an access pre-authorisation token, said access pre-authorisation token having associated therewith an information identifier and a digital signature, and to forward said access pre-authorisation token towards one or more entities on a path across said network; and
at least one receiver entity operable to receive an access pre-authorisation token issued by said at least one token-issuer;

wherein:

said at least one token-issuer is operable to receive a receiver entity private key generated by the control apparatus in respect of said at least one receiver entity, to sign said access pre-authorisation token with a digital signature using said receiver entity private key, and to forward said signed access pre-authorisation token towards said at least one receiver entity;
said at least one receiver entity is operable to receive a token translation key generated by the control apparatus in respect of said at least one receiver entity, to re-sign said signed access pre-authorisation token with a digital signature using said token translation key, and to provide said re-signed token to said access policer; and
said access-policer is operable to receive a token-issuer public key generated by the control apparatus, to verify the authenticity of the digital signature on said re-signed token using said token-issuer public key, and to allow said at least one receiver entity access to said one or more information systems in dependence on said verification.

According to a third aspect of the present invention, there is provided a method of enabling access to one or more information systems by one or more entities on a path across a supply network to be controlled, access to the or each information system being policed by means of an access-policer, the network comprising: at least one token-issuer operable to issue an access pre-authorisation token, said access pre-authorisation token having associated therewith an information identifier and a digital signature, and to forward said access pre-authorisation token towards one or more entities on a path across said network; and at least one receiver entity operable to receive an access pre-authorisation token issued by said at least one token-issuer; the method comprising:

generating, in respect of said at least one receiver entity:
(i) a receiver entity public key/private key pair comprising a public key and a private key, the receiver entity public key enabling a digital signature guaranteeing the authenticity of a message created using the receiver entity private key to be verified; and
(ii) a token translation key, said token translation key enabling translation of a digital signature created using a private key generated in respect of said at least one receiver entity into a digital signature associated with the token-issuer;

generating, in respect of said at least one token-issuer:
(iii) a token-issuer public key/private key pair, said token-issuer public key enabling a digital signature guaranteeing the authenticity of a message created using said token-issuer private key to be verified;

distributing to said at least one token-issuer the receiver entity private key generated in respect of said at least one receiver entity;

distributing to said at least one receiver entity the token translation key generated in respect of said at least one receiver entity; and distributing to said access-policer said token-issuer public key.

The various options and preferred embodiments referred to above in relation to the first aspect are also applicable in relation to the second and third aspects.

Apparatus, systems and methods according to preferred embodiments may be used to allow fine-grained dynamic access control rights to be established automatically as a result of the supply chain operation. This can enable the immediate access to required data without the burden or costs of manually establishing such access rights.

Advantageously (in comparison with the technique set out in International application WO 2009/083710 (discussed above), apparatus, systems and methods according to preferred embodiments can be used to allow security tokens to be issued locally within the receiver premises, for example, and without requiring the use of specialist secure RFID tags.

Apparatus, systems and methods according to preferred embodiments may allow part-generated security tokens to be included within the user memory of, or otherwise associated with RFID tags or other appropriate types of identification devices, which may be attached to or otherwise associated with shipments of goods, for example. Such part-generated tokens may then be "completed" by a receiving party, thereby generating a final authorisation token that may be used in accessing an information system such as the shipping system of an upstream supply chain partner. We will generally refer to a part-generated token as a "pre-authorisation token" and a token whose authorisation has been completed by the receiver as a "final authorisation token". It can be ensured that such a token cannot be generated by a receiver until it has received the initial pre-authorisation token.

Apparatus, systems and methods according to preferred embodiments may allow generation of tokens allowing access to secure serialised information services to occur completely within organisations that have received, are receiving, or will receive particular products. This may remove the burden of issuing such tokens from upstream supply chain partners holding the serialised information, along with the requisite communications facilities and costs involved.

With the technique of International application WO 2009/083710, an RFID tag carries only an initial 'invitation' or reference to the token issuing system, with a view to addressing the problem of unknown downstream supply chain players obtaining serial-level information. It should be noted that that is not the same as, and does not achieve the same as what will be termed a "pre-authorisation token", which, once distributed appropriately, may then be combined with a further secret possessed by a receiving organisation to generate a final, "usable" authorisation token. Pre-authorisation tokens may be arranged to allow the generation of a valid final authorisation token only by the (or an) intended receiving system. Another system "eavesdropping" or reading a pre-authorisation token will not be able to generate the final authorisation token. Further, it may be arranged that even the (or an) intended receiver may not be able to generate the final authorisation token until it has actually received the associated goods and obtained the pre-authorisation token.

Preferred embodiments may thus be of particular use in relation to the automatic establishment of access rights for known downstream participants.

BRIEF DESCRIPTION OF THE DRAWINGS

A preferred embodiment of the present invention will now be described with reference to the appended drawings, in which:

FIG. 1 shows a schematic diagram of a Proxy Re-Signature scheme;

FIG. 2 illustrates how the concept of proxy re-signing may be use in relation to the generation and re-signing of security tokens;

FIG. 3 indicates the types of entities that may be involved in an exemplary supply chain system using a control apparatus, method or system according to an embodiment of the invention, and indicates the roles that may be taken by the entities involved;

FIG. 4 shows illustrates the generation and distribution of keys that may occur in a supply chain system using a control apparatus, method or system according to an embodiment of the invention.

DESCRIPTION OF PREFERRED EMBODIMENTS OF THE INVENTION

Apparatus, systems and methods in accordance with embodiments of the invention will be described later with reference to FIGS. 3 and 4. Firstly, however, a brief explanation of a relevant property of public key/private key cryptography and authentication will be given, following which a brief explanation of relevant information about the concept of proxy re-signing will be given with reference to FIG. 1 and FIG. 2.

Public-key cryptography is a cryptographic approach which involves the use of asymmetric key algorithms instead of or in addition to symmetric key algorithms. Unlike symmetric key algorithms, it does not generally require a secure initial exchange of secret keys between a sender and a receiver. The asymmetric key algorithms may be used to create a mathematically related key-pair, comprising a secret "private key" and a published "public key". Use of these keys allows protection of the authenticity of a message by creating a "digital signature" of a message using the private key, the authenticity of which can be verified using the public key. (A reverse process, known as public key encryption, allows protection of the confidentiality and integrity of a message; according to this process, a message is encrypted using the public key, and can then only be decrypted using the private key—this reverse process is of less relevance to the following explanation however.)

A digital signature can thus be used to demonstrate the authenticity of a digital message or document. A valid digital signature gives a recipient reason to believe that the message was created by a known sender, and that it was not altered in transit. Digital signatures are commonly used for software distribution, financial transactions, and in other cases where it is important to detect forgery and tampering.

In relation to the following explanation, an issue of particular importance from the above summary of public-key cryptography is that for a public key/private key pair (i.e. a key-pair comprising a public key and a private key), the public key enables a digital signature guaranteeing the authenticity of a message created using the private key to be verified.

The concept of proxy re-signing will now be discussed, and terminology that will be used later will be introduced and explained.

With reference to FIG. 1, a proxy re-signature process is a process wherein a proxy is given information allowing it to transform the digital signature of a first entity (i.e. "Alice", in the example of FIG. 1) into the digital signature of a second entity (i.e. "Bob"). Proxy re-signing allows this to be achieved without the proxy needing to have control of or access to the private keys associated with either Alice or Bob, therefore it cannot generate the digital signature for either Alice or Bob itself. This primitive was introduced in a paper entitled "Divertible Protocols and Atomic Proxy Cryptography" by Matt Blaze, Gerrit Bleumer and Martin Strauss (Advances in Cryptology—EUROCRYPT '98, volume 1403 of Lecture Notes in Computer Science (LNCS), pages 127-144, 1998) and has been explored further in a paper entitled "Proxy Re-Signatures: New Definitions, Algorithms, and Applications" by Giuseppe Ateniese and Susan Hohenberger (ACM Conference on Computer and Communications Security, pages 310-319, Nov. 28, 2005).

With reference to FIG. 1, the proxy 12 translates a perfectly-valid and publicly-verifiable signature from Alice 10 into one from Bob 14. Given a message 'm' and signing that message with Alice's secret private key generates a signature $K_s\_a(m)$, whereas signing the same message with Bob's secret private key generates signature $K_s\_b(m)$. (It will be noted that the subscript "s" is used in symbolising ("secret") private keys $K_s$ . . . in order to distinguish from the subscript "p" which will be used in symbolising "public" keys $K_p$ . . . .) In the proxy re-signature scheme, a proxy would receive the signature $K_s\_a(m)$ from Alice and, by using a "translation key" $K_t\_a \to b$, it can convert the signature from Alice into a valid signature $K_s\_b(m)$ from Bob. This can be written as follows:

$$K_t\_a \to b(K_s\_a(m)) = K_s\_b(m)$$

where:
  $K_s\_a$ is Alice's private key [so message 'm' signed by Alice is written as $K_s\_a(m)$]
  $K_s\_b$ is Bob's private key [so message 'm' signed by Bob is written as $K_s\_b(m)$]
  $K_t\_a \to b$ is the translation key from Alice to Bob Thus, subjecting a message signed using Alice's private key to the translation key from Alice to Bob provides a result equivalent to the message signed instead using Bob's private key. As a result of the issue highlighted as being of particular importance in the above summary of public-key cryptography, it be understood that any user that has access to Bob's public key can therefore verify the signature generated by the proxy.

A property of proxy re-signature is that the "translation" from one signature to another can be performed in sequence and multiple times by distinct proxies without requiring the intervention of the signing entities (i.e. the owners of the private keys). In this way, the private keys can always remain offline and protected. All the signatures are publicly verifiable signatures as if they were signed by the real owner of the distinct entities.

In relation to security token re-signing for the presently-proposed scheme to be described, which will be explained in detail below, it is preferred to use a unidirectional scheme, i.e. one that would allow the translation of a signature from Alice to one from Bob, but not from a signature from Bob to one from Alice. As will be understood from the explanation later, in relation to the presently-proposed scheme this corresponds to the translation of a token signed using the private key of the receiver into a token that is identical to one signed using the private key of the pre-authorisation token issuer. This is shown in FIG. 2. In the presently-proposed scheme, the re-signature key is generally expected to be known only to the product receiver who creates the final authorisation token. As will be understood, the re-signature key is used to perform a "translation" function (i.e. translation of a token signed using the private key of one entity into a token that is identical to one signed using the private key of another entity), thus the term "translation key" will be used instead if the term "re-signature key" in the following explanation, although the terms are in fact interchangeable.

With reference to FIG. 3, there is shown a supply chain control system 30 together with other entities that may be involved in a supply-chain system. The supply chain control system 30 may be implemented in one or more computer systems. The supply chain control system 30 is able to communicate with one or more pre-authorisation token issuers (symbolised by the letter T) 32, one or more receivers (symbolised as R1, R2, . . . , Rn) 34, and with one or more information system (symbolised as IS1, IS2, . . . , ISn) 36. Each of these entities may themselves perform their respective functions by means of their own computer systems.

The supply chain control system 30 has stored therein (i.e. in a memory component, for example) a supply chain model 310, indicating to the controller possible relationships between the other entities, such as which token issuer(s) is/are permitted to enable which receiver(s) to access which information system(s). The supply chain control system 30 also contains a functional component which will be referred to as a Key Generator 320 whose function is to generate public/private key-pairs and token translation keys as appropriate, and a functional component which will be referred to as a Key Distributor 330, whose function is to distribute keys generated by the Key Generator 320 to the pre-authorisation token issuer(s) 32, the receiver(s) 34, and the information system(s) 36. The supply chain control system 30 is also shown as having a "rubbish bin" 340. This need not be an actual component of the controller 30—it is symbolised in FIG. 3 (and in FIG. 4, to be discussed later) in order to indicate that not all of the keys generated by the Key Generator 320 are subsequently distributed by the Key Distributor 330. In preferred embodiments, as will be understood, one category of key is preferably used only by the controller itself, and may then be destroyed, rather than distributed to any other entity.

The communication between the supply chain control system 30 and the other entities generally involves key distribution and is indicated in FIG. 3 by wide, dotted-line framed arrows. This may be performed by means of the Internet, or using any of a variety of communication techniques, and is such that the supply chain control system 30 is operable to distribute appropriate keys (directly or indirectly) to each of the other entities, as will be described later. A different type of exchange, involving tokens, takes place between the other entities 32, 34, 36 themselves. Tokens (of a first type, namely pre-authorisation tokens) may pass from a token issuer 32 to a receiver 34 by virtue of being stored in, attached to, or otherwise associated with items traversing a supply chain, for example, and tokens (of a second type, namely final authorisation tokens) may then be provided by a receiver 34 to an information system 36. Exchanges involving tokens (as opposed to keys) are indicated in FIG. 3 by single-line arrows.

FIG. 4 illustrates how the various keys may be distributed. In order to simplify the FIG. 5 and the following explanation, just one receiver R1 is shown. This receiver R1 is shown as receiving pre-authorisation tokens from just one pre-authorisation token issuer T, and attempting to gain access to just one information system IS (although as explained in relation to FIG. 3 earlier, there will in general be more than one receiver in a supply chain, and there may be more than token issuer and more than one information system).

As shown in FIG. 4, a supply chain control system 30 creates a set of keys associated with the (or with each, if there are more than one) pre-authorisation token issuer 32. One or more private/public key pairs are generated for each receiving system 34 to which access may be granted to the relevant information system(s) 36. Thus, for a first receiver organisation 34 shown as "Receiver R1", a private (or "secret") key $K_s\_R1$ and a public key $K_p\_R1$ are generated, and for a second receiver organisation "Receiver R2" (not shown in FIG. 4), a private key $K_s\_R2$ and a public key $K_p\_R2$ would be generated. A further private/public key pair $[K_s\_T, K_p\_T]$ is also generated in respect of the pre-authorisation token issuer T, but it will be noted that neither key is sent thereto (the manner in which this key-pair is used is explained below). Furthermore, for each receiver organisation 34 that may access the information system(s) 36, a token translation key is produced, which may be used for translation (i.e. proxy re-signing) of a digital signature created using the private key generated in respect of that receiver into a digital signature associated with the pre-authorisation token issuer, and which is trusted by the information system(s) in question (or by an access policer 38 acting on its/their behalf) when deciding whether to grant access to the information system(s) in question. Thus, token translation key $K_t\_R1 \rightarrow T$ is produced for "Receiver R1", and token translation key $K_t\_R2 \rightarrow T$ is produced for "Receiver R2", etc. Each token translation key is then distributed to the relevant receiver organisation 34 that may access the information system(s) 36, along with the public key for that organisation. It should be noted that the associated private key for each receiver organisation is not distributed to the organisation in question, but is instead sent to the pre-authorisation token issuer 32. The public key $K_p\_T$ for the pre-authorisation token issuer 32 is distributed to any information system 36 for which the pre-authorisation token issuer is generating access tokens.

The token translation key generated in respect of a particular receiver is generally generated in dependence on the private key that has been generated in respect of the token-issuer concerned and in dependence on the private key that has been generated in respect of that receiver. The private key $K_s\_T$ generated in respect of the token issuing system 32 is thus used by the controller 30 in producing the respective token translation keys $K_t\_R1 \rightarrow T$ for "Receiver R1" and $K_t\_R2 \rightarrow T$ for "Receiver R2", but the token issuer private key $K_s\_T$ does not need to be disseminated to any other entity at any stage in the procedure, and may therefore be destroyed by the controller 30 (as indicated by the arrow to the rubbish bin referred to in FIG. 3).

It will be noted that the information system 36 in FIG. 4 is shown as having an access policer 38 component within it. This is shown in order to illustrate that in addition to its function of providing information, information system 36 performs a policing function whereby a decision is first taken as to whether or not to grant requests for access to the information system in question. The access policer 38 component may be a part of the information system 36 itself, or may be an external component, and need not in fact be performed under the control of the same organisation as the information system.

It is worth noting at this stage that the supply chain control system 30 may be operated by the same organisation as the information system(s) 36, or may be operated by a trusted third party, for example. Information systems may however be under the control of or acting on behalf of organisations other than those under whose control the supply chain controller is being operated; they may be under the control of organisations responsible for the provision of goods, for example.

The pre-authorisation token issuer generates a signed pre-authorisation token for the product or asset identifier contained within or otherwise associated with an item identifier (such as an RFID tag). Minimally this token is the identifier encrypted with a private key associated with the intended receiver, although other information may be included, as will be explained later. This pre-authorisation token is then stored in the user memory of the RFID tag (or other such associated item identifier). The token can also include a further unencrypted identifier which can be used to identify the issuing party who created the pre-authorisation token, for example.

This shipping process may then be performed involving the following steps:
1. A product or asset identifier is read from the item identifier (e.g. RFID tag).
2. An intended receiver is identified to which access to an information system is intended to be granted.
3. A private key associated with the intended receiver is retrieved from key store.
4. A pre-authorisation token is generated by signing the identifier and other optional data using the private key of the intended receiver, and adding the unencrypted token issuer identifier.
5. The pre-authorisation token is written into the user memory of the RFID tag
6. The public key of the pre-authorisation token issuer is added to the access control list of the information system (in the event that it does not already exist).

When the product or asset is received, the receiver reads the pre-authorisation token from the user memory of the tag, incorporating the identifier of the pre-authorisation token issuer. This identifier is used to retrieve the correct a token translation key (since there may be many pre-authorisation token issuing systems). Optionally the pre-authorisation token may be decrypted using the public key of the receiving organisation related to the token issuer. In this manner the receiving organisation can check that the pre-authorisation token is genuine for the product identifier and has been issued by the expected token issuer. This prevents the receiving organisation from requesting access to information systems with invalid tokens.

The pre-authorisation token is then re-encrypted with the token translation key. This produces the final authorisation token which can be validated using the public key of the pre-authorisation token issuer (where validation involves decrypting the token with the public key to obtain an identifier that matches the product identifier).

The receiving process may thus be performed as follows:
1. Product/asset identifier, pre-authorisation token(s) (including token issuer identifier) are read from the RFID tag
2. For each token the public key of the receiver is retrieved from a key store (indexed by token issuer identifier)
3. Each token is verified using the relevant public key
4. For each token the translation key is retrieved from the key store (indexed by token issuer identifier)
5. Each token is then re-encrypted using the retrieved translation keys The receiver may now attempt to access the information systems of the shipper. The client in the receiving organisation includes the final authorisation token in the information request for product or asset information. The information system decrypts the final authorisation token using the public key $K_{p\_}T$ of the pre-authorisation token issuer. This may be assisted by including the pre-authorisation token issuer identifier unencrypted within the token. If the product identifier retrieved from within the token corresponds to the identifier requested by the client and the token issuer is trusted to release access for such an identifier, then the access is allowed to proceed.

The information system access control process may be as summarised below:
1. Receive access request incorporating final authorisation token (or tokens, if there are multiple information items involved, for example).
2. Retrieve public keys of trusted pre-authorisation token issuers (indexed by pre-authorisation token issuer identifier).
3. Decrypt tokens using public keys.
4. Inspect further access control criteria within token and make access decision.

The pre-authorisation token issuer will commonly belong to the same organisation as the information systems for which it is producing pre-authorisation tokens. However, the information system organisation may also trust other parties to produce pre-authorisation tokens. In this manner they can delegate the control of access to their information systems to other parties. In order to trust a pre-authorisation token issuer they add the issuer's public key to the list of keys that are permitted to validate authorisation tokens during the information access.

Where we have described the simplest token being an encrypted product or asset identifier, other information may also be included in the token. Other common types of information may include an expiry date for the token. In this case even if the token is validated using the public key of the pre-authorisation token issuer, the information access will not be allowed to proceed if the token has expired. The pre-authorisation token issuer may also include other restrictions on the information access by placing additional policy constraints within the token. For example the token may also include the constraint that the information record must be of the type "shipping". When the information system decrypts the security token it may then apply any such restrictions.

Multiple Receivers

Various options exist according to different embodiments for controlling the access of multiple downstream supply chain partners. A particularly simple option is simply to include each receiver as an entity in the supply chain model 310 of the controller 30. A separate token may then be generated for each discrete receiver entity 34. An single item identifier such as an RFID tag may carry several pre-authorisation tokens for a number of receivers to be able to generate their own final authorisation tokens. This approach has the drawback that multiple tokens will generally require additional memory space, which may be a problem with some types of RFID tag or other item identifiers.

An alternative approach is to group multiple receivers into sets. Each set may then be allocated a public/private key pair within the supply chain model 310 of the controller 30. A pre-authorisation token which is to be shared between receiver entity A and entity B may be signed using the private key for the set A+B. Both A and B receive the same translation key to be able to generate the final authorisation token.

Delegation

There are several options available to enable the delegation of access control rights from one downstream receiver to another party. If the second party is also within the physical supply chain path for the goods, the receiver A may simply inform receiver B of the correct translation key required in order to generate the final authorisation key. This enables B to generate final authorisation tokens for any goods destined for receiver A. If/when this delegation is revoked, the controller 30 may then need to generate new keys for receiver A (along with new translation keys) and distribute these to the token issuer and receiver A.

Another alternative is for receiver A to generate the final authorisation token and share this over a secure communications network with receiver B. In this case receiver A retains the confidentiality of its keys and can delegate the tokens on a per-item basis, for example.

Finally if the information system is willing to trust receiver A to manage onward access rights delegation, receiver A may operate its own pre-authorisation token issuer. In this case the original pre-authorisation token may be replaced with one generated by the pre-authorisation token issuer of receiver A. The public key of receiver A's token issuer may then be added to the trusted list of the information service.

The invention claimed is:

1. Control apparatus for enabling access to one or more information systems by one or more entities on a path across a supply network to be controlled, access to the or each information system being policed by means of an access-policer, the network comprising: at least one token-issuer operable to issue an access pre-authorisation token, said access pre-authorisation token having associated therewith an information identifier and a digital signature, and to forward said access pre-authorisation token towards one or more entities on a path across said network; and at least one receiver entity operable to receive an access pre-authorisation token issued by said at least one token-issuer;

the control apparatus comprising:
a key generator, implemented using one or more computer systems and operable to generate, in respect of said at least one receiver entity:
(i) a receiver entity public key/private key pair comprising a public key and a private key, the receiver entity public key enabling a digital signature guaranteeing the authenticity of a message created using the receiver entity private key to be verified; and
(ii) a token translation key, said token translation key enabling translation of a digital signature created using a private key generated in respect of said at least one receiver entity into a digital signature associated with the token-issuer;
the key generator being further operable to generate, in respect of said at least one token-issuer:
(iii) a token-issuer public key/private key pair, said token-issuer public key enabling a digital signature guaranteeing the authenticity of a message created using said token-issuer private key to be verified;
the control apparatus further comprising a key distributor, implemented using the one or more computer systems and operable to distribute:
to said at least one token-issuer, the receiver entity private key generated in respect of said at least one receiver entity;
to said at least one receiver entity, the token translation key generated in respect of said at least one receiver entity; and
to said access-policer, said token-issuer public key.

2. Control apparatus according to claim 1 wherein said key distributor is further operable to distribute to said at least one receiver entity the receiver entity public key generated in respect of said at least one receiver entity.

3. Control apparatus according to claim 1 wherein said access pre-authorisation token is stored in a memory component of the information identifier with which said token is associated.

4. Control apparatus according to claim 1, wherein said digital signature is stored in a memory component of the information identifier with which said token is associated.

5. Control apparatus according to claim 1 wherein said information identifier is stored on a radio-frequency identification device.

6. Control apparatus according to claim 1 wherein said token translation key generated in respect of a particular receiver entity is generated in dependence on the token-issuer private key of the key-pair generated in respect of the token-issuer.

7. Control apparatus according to claim 1 wherein said token translation key generated in respect of a particular receiver entity is generated in dependence on the receiver entity private key generated in respect of said at least one receiver entity.

8. Control apparatus according to claim 1 wherein said token-issuer public key generated in respect of a particular token-issuer enables a digital signature guaranteeing the authenticity of a message created using a receiver-entity private key associated with said at least one receiver entity then translated using a token translation key generated in respect of said at least one receiver entity to be verified.

9. Control apparatus according to claim 8 wherein said token-issuer public key generated in respect of a particular token-issuer enables a digital signature guaranteeing the authenticity of a message created using a receiver entity private key associated with said at least one receiver entity then translated using a token translation key generated in respect of said at least one receiver entity to be verified in the event that said receiver entity private key generated in respect of said receiver entity has been distributed to said token-issuer.

10. Control apparatus according to claim 1 wherein said token-issuer is under the control of an entity trusted by the access policer of one or more information systems to grant access to said one or more information systems.

11. Control apparatus according to claim 1 for enabling access to one or more of a plurality of information systems to be controlled, access to said information systems being policed by means of respective access-policers.

12. Control apparatus according to claim 1 for enabling access to one or more information systems by one or more entities on a path across a supply network to be controlled, said network comprising a plurality of token-issuers each operable to issue access pre-authorisation tokens.

13. Control apparatus according to claim 1 for enabling access to one or more information systems by one or more entities on a path across a supply network to be controlled, said network comprising a plurality of receiver entities each operable to receive access pre-authorisation tokens issued by a token-issuer.

14. A system for enabling access to one or more information systems by one or more entities on a path across a supply network to be controlled, access to the or each information system being policed by means of an access-policer, the system comprising:
control apparatus according to claim 1;
at least one token-issuer operable to issue an access pre-authorisation token, said access pre-authorisation token having associated therewith an information identifier and a digital signature, and to forward said access pre-authorisation token towards one or more entities on a path across said network; and
at least one receiver entity operable to receive an access pre-authorisation token issued by said at least one token-issuer;
wherein:
said at least one token-issuer is operable to receive a receiver entity private key generated by the control apparatus in respect of said at least one receiver entity, to sign said access pre-authorisation token with a digital signature using said receiver entity private key, and to forward said signed access pre-authorisation token towards said at least one receiver entity;

said at least one receiver entity is operable to receive a token translation key generated by the control apparatus in respect of said at least one receiver entity, to re-sign said signed access pre-authorisation token with a digital signature using said token translation key, and to provide said re-signed token to said access policer; and said access-policer is operable to receive a token-issuer public key generated by the control apparatus, to verify the authenticity of the digital signature on said re-signed token using said token-issuer public key, and to allow said at least one receiver entity access to said one or more information systems in dependence on said verification.

15. A method of enabling access to one or more information systems by one or more entities on a path across a supply network to be controlled, access to the or each information system being policed by means of an access-policer, the network comprising: at least one token-issuer operable to issue an access pre-authorisation token, said access pre-authorisation token having associated therewith an information identifier and a digital signature, and to forward said access pre-authorisation token towards one or more entities on a path across said network; and at least one receiver entity operable to receive an access pre-authorisation token issued by said at least one token-issuer;

the method comprising:

generating, in respect of said at least one receiver entity:
  (i) a receiver entity public key/private key pair comprising a public key and a private key, the receiver entity public key enabling a digital signature guaranteeing the authenticity of a message created using the receiver entity private key to be verified; and
  (ii) a token translation key, said token translation key enabling translation of a digital signature created using a private key generated in respect of said at least one receiver entity into a digital signature associated with the token-issuer;

generating, in respect of said at least one token-issuer:
  (iii) a token-issuer public key/private key pair, said token-issuer public key enabling a digital signature guaranteeing the authenticity of a message created using said token-issuer private key to be verified;

distributing to said at least one token-issuer the receiver entity private key generated in respect of said at least one receiver entity;

distributing to said at least one receiver entity the token translation key generated in respect of said at least one receiver entity; and distributing to said access-policer said token-issuer public key.

* * * * *